(12) United States Patent
Stickney

(10) Patent No.: US 6,311,639 B1
(45) Date of Patent: Nov. 6, 2001

(54) DOG BONE HOLDER

(76) Inventor: Michael William Stickney, 272 Lenox Ave., Mansfield, OH (US) 44906

( * ) Notice: Subject to any disclaimer, the term of this patent is extended or adjusted under 35 U.S.C. 154(b) by 0 days.

(21) Appl. No.: 09/461,452

(22) Filed: Dec. 14, 1999

(51) Int. Cl.[7] .................................................. A02K 5/00
(52) U.S. Cl. ............................................................ 119/51.01
(58) Field of Search ............................ D30/133; D8/373; 248/311.2; 119/51.01

(56) References Cited

U.S. PATENT DOCUMENTS

| | | | |
|---|---|---|---|
| D. 120,628 | * 5/1940 | Jembrzycki | D8/373 |
| D. 357,557 | * 4/1995 | Piper | D30/133 |
| 5,971,335 | * 10/1999 | Perrin et al. | 248/311.2 |

* cited by examiner

*Primary Examiner*—Charles T. Jordan
*Assistant Examiner*—Jordan M Lofdahl
(74) *Attorney, Agent, or Firm*—Jerry Semer

(57) ABSTRACT

The device is a dog bone holder. In the preferred embodiment device is cubical in shape with an opening at the top or bottom or both. A channel from the top is cut in one or more of the sides. If the channel runs from the top, the channel is shaped like a "z" lying on its side. If the channel runs from the bottom the channel is shaped as a upside down "u" with one side not fully extending. A bone is placed in these channels for the dog to chew upon. The channels will hold the bone firmly in place. In another embodiment of the invention, the channel is short and straight. Only approximately a long a the bone is wide. In this embodiment a covering for the open top or bottom holds the bone in place. On the bottom or side of the bone holder are suction cups, or glue or some other method to hold the bone holder to the floor.

18 Claims, 5 Drawing Sheets

DOG BONE HOLDER

BACKGROUND OF THE INVENTION

Dogs like to chew. Thus we, humans, give them bones. All types of commercial bones are on the market. However there is nothing to hold the bone for the dog. In order for a dog to eat a bone, the bone must be held upright. A dog can do this in two ways, either by holding the bone between its feet or holding the bone up against an object. When the dog holds the bone up against an object the dog sometimes chews on the object rather than the bone. Thus one of the objectives of this invention is to produce a device that holds a bone at just the right height for a dog to chew without the dog having to hold the bone with its feet. Another problem that arises is that the dog often picks an inconvenient place to chew the bone. Often they choose a place right in the walkway. Thus an objective of this invention is to create a bone holder where the dog's owner can choose where the dog will chew his bone. Another objective of the invention is to eliminate bone and parts of bone lying around the house. Dogs are not good a putting their bone away when they are through with them. They just leave them lying. The dog bone holder holds the bones even after the dog is through.

The feature that achieves these objectives is a device that holds a dog one for the dog to chew upon. The holder can also be fastened to the wall or floor to keep the device in one place.

SUMMARY OF THE INVENTION

The device is a dog bone holder. In the preferred embodiment the device is cubical in shape with an opening at the top or bottom or both. A channel from the top is cut in one or more of the sides. If the channel runs from the top, the channel is shaped like a "z" lying on its side. If the channel runs from the bottom the channel is shaped as a upside down "u" with one side not fully extending. A bone is placed in these channels for the dog to chew upon. The channels will hold the bone firmly in place. In another embodiment of the invention, the channel is short and straight. Only approximately as long as the bone is wide. In this embodiment a covering for the open top or bottom holds the bone in place. On the bottom or side of the bone holder are suction cups, or glue or some other method to hold the bone holder to the floor.

DETAILED DESCRIPTION OF THE PREFERRED EMBODIMENT

Figure 1:
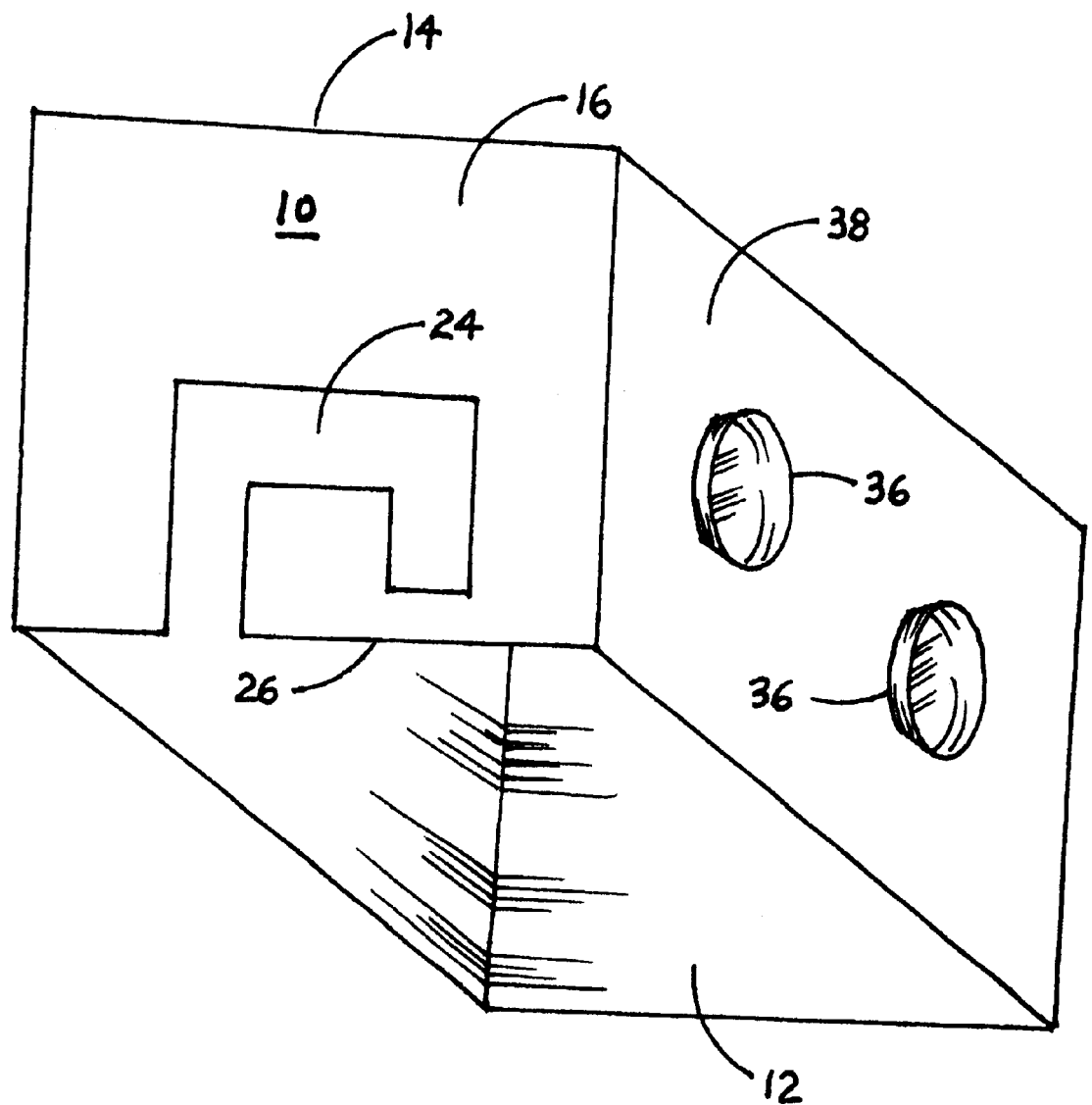
FIG. 1 is a perspective view of the invention.
Figure 3:
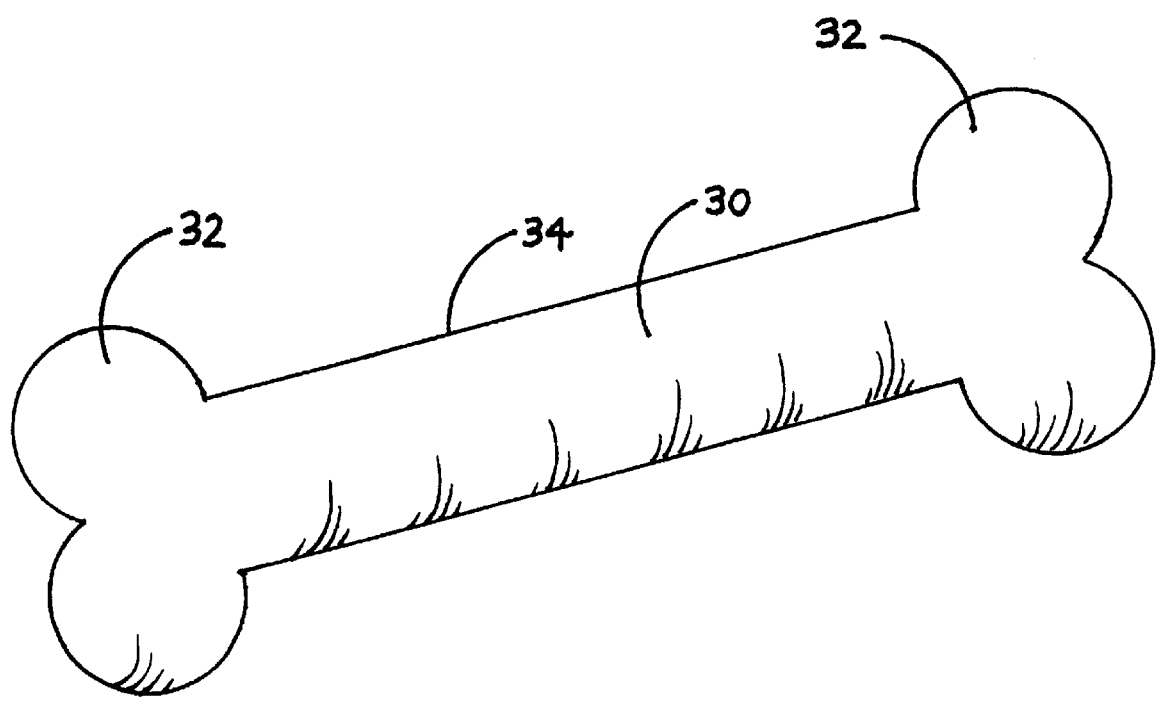
FIG. 3 is a perspective view of a bone.

FIG. 1 is a perspective view of the invention. FIG. 1 shows a cubical shaped housing 10 with four sides 16 and with an open top 12 and bottom 14. Although all embodiment of the invention are shown in the drawing to be cubical in shape, the invention outer wall can take the form of any polyhedron. As one can see from this FIG. 1 a channel 24 run from the bottom 26 of the side 16. Channel 24 starts from the bottom 26 of side 16 and runs upwards. The channel 24 the turns to the horizontal a short distance then again turns vertical and downward. The dog bone holder is designed to hold bones 30 similar to the one shown in FIG. 3. The bone 30 shown in FIG. 3 has large knobs 32 on its ends and a smaller rod-like section for a midsection 34. The channel 24 width is larger the width of the bone's 30 midsection 34, but smaller than the width of the large knobs 32 on the end of the bone 30. Thus once a bone 30 is placed in the channel 24 and moved to the end of the channel 24, the bone can not be removed by the dog until it is chewed.

FIG. 1 shows a side 38 of this invention without a channel 34. On this side one can see suction cups 36 which are used to fasten the dog bone holder to a wall. There are many other methods known in the art to fasten the dog bone holder to the wall. There are methods to permanently fasten the dog bone holder to the wall such as gluing, nailing, etc. There are also numerous methods to non-permanently attach the dog bone holder to the wall. One could also use a pressure sensitive, releasable adhesive glue, tape or webbing.

Figure 2:
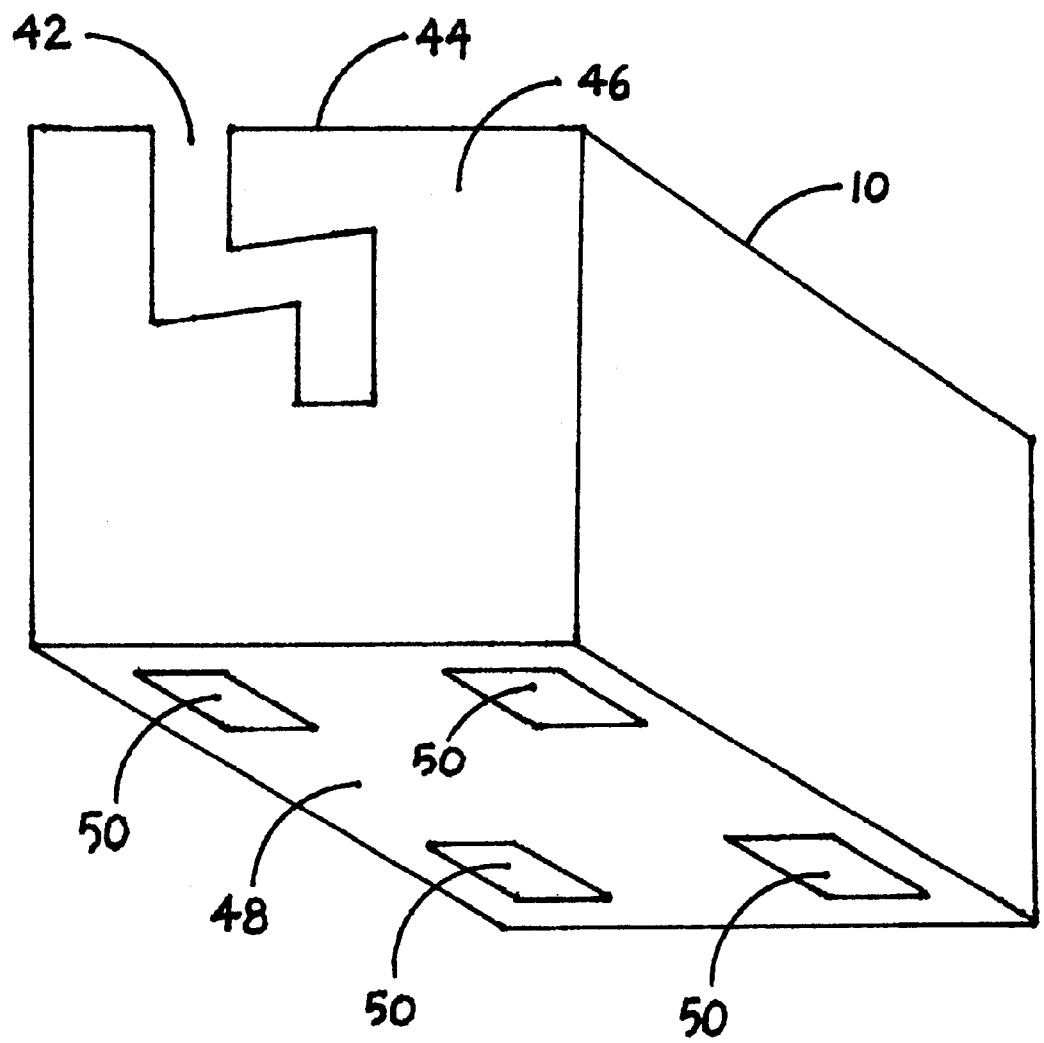
FIG. 2 is a first perspective view of another embodiment of the invention.

FIG. 2 is another embodiment of the invention. In this embodiment the channel 42 run from the top the dog bone holder. The channel 42 starts at the top 44 of the side 46 of the dog bone holder 10 and run vertically downward. Then it turns and run on an upward angle as shown in FIG. 2. Before the channel 42 gets to the top 44 of the side 46 of the dog bone holder 10 the channel 42 again turns downward. As in the previous embodiment, the dog bone holder is designed to hold bones 30 similar to the one shown in FIG. 3. The channel 42 width is larger the width of the bone's 30 midsection 34, but smaller than the width of the large knobs 32 on the end of the bone 30. Thus once a bone 30 is placed in the channel 42 and moved to the end of the channel 42, the bone 30 can not be removed by the dog until it is chewed. FIG. 2 shows the bottom view of the invention and it shows tape 50 on the bottom. This tape with a pressure sensitive, releasable adhesive on the bottom is designed to hold the bone holder to the floor or wall for the dog to chew on the bone 30. The tape 50 can also have a permanent adhesive. The advantages of a pressure sensitive, releasable adhesive is that the dog bone hold can be moved from one location to another.

Figure 4:
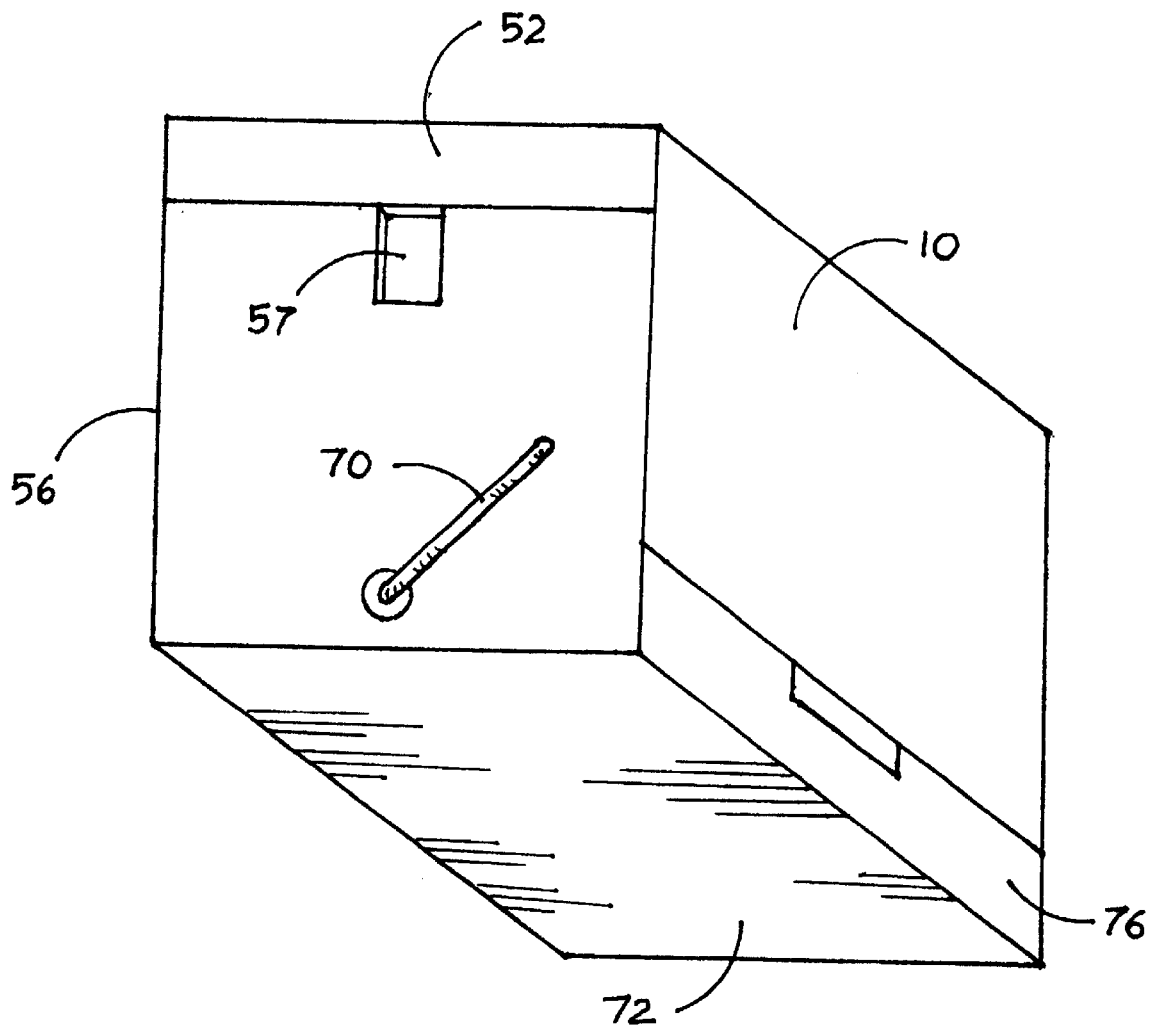
FIG. 4 is a perspective view of another embodiment of the invention.

FIG. 4 shows another embodiment of the invention. In this embodiment the dog bone holder has top or lid 52. The lid 52 forms the top of the channel 54. In FIG. 4 the channel 54 is very short and extends down from the top of the side 56 of the dog bone holder. As in the previous embodiment, the dog bone holder is designed to hold bones 30 similar to the one shown in FIG. 3. In the embodiment of FIG. 4 the channel 54 width and height is only slightly larger the circumference of the bone's 30 midsection 34, but the channel width and height is smaller than the circumference of the large knobs 32 on the end of the bone 30. To place the bone 30 in the channel 54 one removes the lid 52, places the bone 30 in the channel 54 and places the lid 52 back on the dog bone holder.

Figure 5:
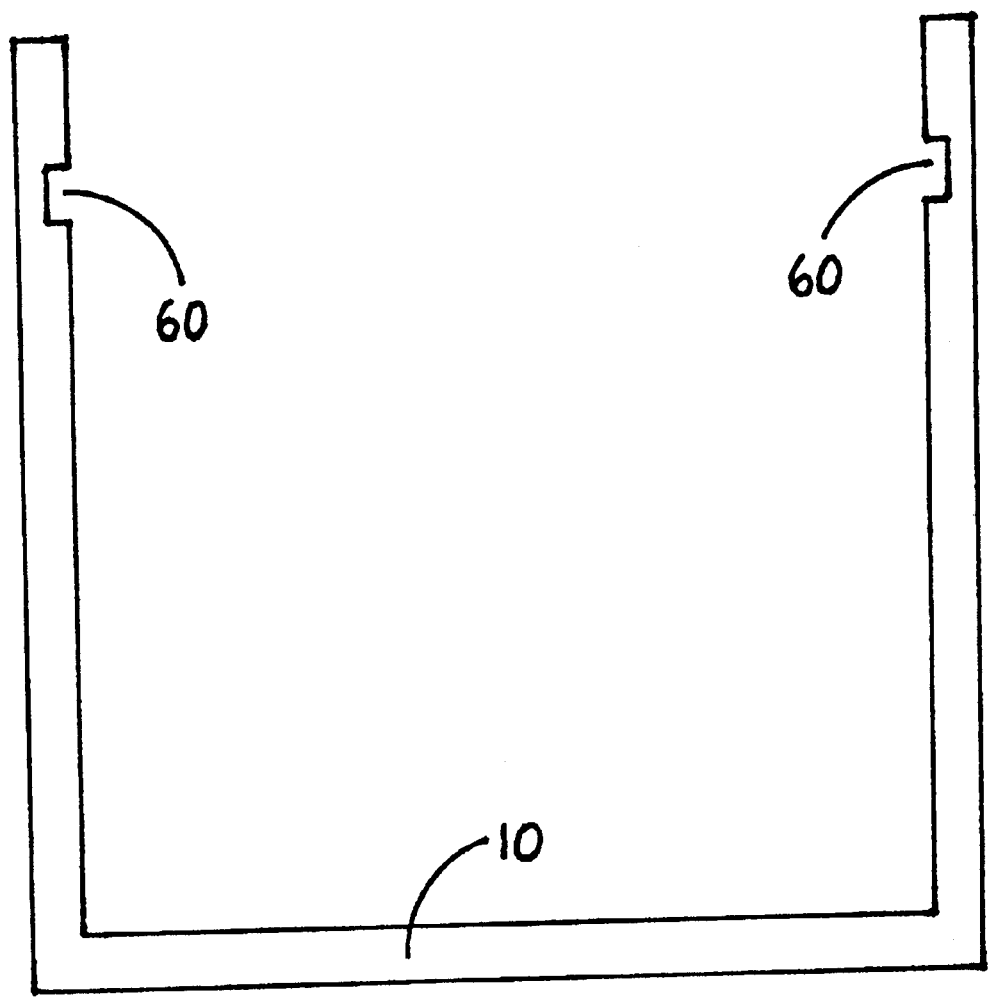
FIG. 5 is a top view of the sides of the invention.

FIG. 5 is a cutaway view of the dog bone holder sides. FIG. 5 shows a grove 60 running around the top of the housing 10. FIG. 4 shows the side of the dog bone holder 10 on the side on which the lid 52 is placed. As one can see from FIG. 4 and 5 the side 56 of the dog bone holder 10 only extends upward to a point just below the grove 60. This enabled the lid 52 to be slid into the grove 60 to cover the dog bone holder 10. The lid 52 can also be attached to the dog bone holder by several methods known in the art such as hinges.

FIG. 4 is a perspective view showing the bottom. FIG. 4 shows a lever 70 that operates the vacuum system that holds the dog bone holder to a floor or wall. In the system a flexible membrane 72 covers the bottom of the dog bone holder. When lever 70 is moved downward the lever raise the center of the membrane 72. When the dog bone holder is on the floor or up against a wall the movement of the lever which pulls up the center of the membrane 72 cause a vacuum cavity to be created which hold the dog bone holder to the floor or wall.

FIG. 4 also shows the dog bone holder with a drawer 76 in the bottom. This drawer 76 can be used to hold many items related to the dog.

Changes and modifications in the specificity described embodiments can be carried out without departing from the scope of the invention which is intended to limited only by the scope of the appending claims.

What is claimed is:

1. A dog bone holder comprising:
   a. a housing; and,
   b. a channel which is of sufficient size that the bone's smallest diameter can fit within the channel however the channel is of a size that another portion of the bone is larger such that when the bone is placed in the channel it can not be removed by a dog; and,
   c. a means for attaching the housing to a flat surface.
2. A dog bone holder as in claim 1 wherein:
   a. the housing has an open top.
3. A dog bone holder as in claim 1 wherein:
   a. the housing has an open bottom.
4. A dog bone holder as in claim 2 wherein:
   a. the channel extends downward from the top and said channel is of sufficient length and curvature that the bone can not be removed by a dog.
5. A dog bone holder as in claim 3 wherein:
   a. the channel extends upward from the bottom and said channel is of sufficient length and curvature that the bone can not be removed by a dog.
6. A dog bone holder as in claim 1 wherein:
   a. the means for attaching the housing to a flat surface is a vacuum means.
7. A dog bone holder as in claim 6 wherein:
   a. the vacuum means is suction cups.
8. A dog bone holder as in claim 1 wherein:
   a. the means for attaching the housing to a flat surface is an adhesive.
9. A dog bone holder as in claim 1 wherein:
   a. the means for attaching the housing to a flat surface is a pressure sensitive, releasable adhesive.
10. A dog bone holder as in claim 1 wherein:
    a. the means for attaching the housing to a flat surface is a vacuum means.
11. A dog bone holder as in claim 10 wherein:
    a. the vacuum means is suction cups.
12. A dog bone holder as in claim 1 wherein:
    a. the means for attaching the housing to a flat surface is an adhesive.
13. A dog bone holder as in claim 1 wherein:
    a. the means for attaching the housing to a flat surface is a pressure sensitive, releasable adhesive.
14. A dog bone holder as in claim 5 wherein:
    a. the means for attaching the housing to a flat surface is a vacuum means.
15. A dog bone holder as in claim 14 wherein:
    a. the vacuum means is suction cups.
16. A dog bone holder as in claim 5 wherein:
    a. the means for attaching the housing to a flat surface is an adhesive.
17. A dog bone holder as in claim 5 wherein:
    a. the means for attaching the housing to a flat surface is a pressure sensitive, releasable adhesive.
18. A dog bone holder as in claim 2 further comprising:
    a. the channel extends downward from the top; and,
    b. a top to the housing; and,
    c. the top covers the channel and forms an opening which is of sufficient size that the bone's smallest diameter can fit within the opening however the opening is of a smaller size than other portions of the bone such that when the bone is placed in the channel and the top covers the channel the bone can not be removed by a dog.

* * * * *